(12) United States Patent
Cocchi et al.

(10) Patent No.: US 8,404,166 B2
(45) Date of Patent: *Mar. 26, 2013

(54) METHOD FOR THE PRODUCTION OF INTEGRATED SEALING ELEMENTS ON PLASTIC ARTICLES BY OVERMOULDING WITH SILICONE FILMS

(75) Inventors: Gino Cocchi, Bologna (IT); Roberto Lazzarini, Reggio Emilia (IT)

(73) Assignee: Carpigiani Group—Ali S.p.A. (IT)

( * ) Notice: Subject to any disclaimer, the term of this patent is extended or adjusted under 35 U.S.C. 154(b) by 2 days.

This patent is subject to a terminal disclaimer.

(21) Appl. No.: 12/314,330

(22) Filed: Dec. 8, 2008

(65) Prior Publication Data

US 2009/0200696 A1   Aug. 13, 2009

Related U.S. Application Data

(62) Division of application No. 10/452,251, filed on Jun. 3, 2003, now Pat. No. 7,476,353.

(30) Foreign Application Priority Data

Jul. 5, 2002 (IT) .............................. GE2002A0061

(51) Int. Cl.
*B29C 47/06* (2006.01)
(52) U.S. Cl. ................ 264/173.16; 264/174.11; 264/241
(58) Field of Classification Search ............. 264/173.16, 264/241, 174.11
See application file for complete search history.

(56) References Cited

U.S. PATENT DOCUMENTS

| | | | |
|---|---|---|---|
| 3,052,381 A * | 9/1962 | Poerio Carpigiani | ......... 222/132 |
| 3,724,234 A | 4/1973 | Garavelli | |
| 3,767,169 A | 10/1973 | Carpigiani | |
| 3,943,091 A | 3/1976 | Akiyama | |
| 4,378,164 A | 3/1983 | Manfroni | |
| 4,463,704 A | 8/1984 | Farnum | |
| 4,488,817 A | 12/1984 | Uesaka et al. | |
| 4,629,648 A | 12/1986 | Minick et al. | |
| 4,711,376 A | 12/1987 | Manfroni | |
| 4,784,641 A | 11/1988 | White | |
| 4,836,420 A | 6/1989 | Kromrey | |

(Continued)

FOREIGN PATENT DOCUMENTS

| | | |
|---|---|---|
| DE | 2059737 | 6/1972 |
| DE | 8235486 | 2/1986 |

(Continued)

OTHER PUBLICATIONS

O-rings West website from Nov. 2001. The materials section shows that silicone rubber is a common material for use in O-rings. It also shows resistance to animal and vegitable fats and heat and cold stability. http://web.archive.org/web/20011128001303/http://oringswest.com/.*

*Primary Examiner* — Yogendra Gupta
*Assistant Examiner* — Robert J Grun
(74) *Attorney, Agent, or Firm* — Timothy J. Klima; Shuttleworth & Ingersoll, PLC

(57) ABSTRACT

Method for the production of sealing elements on plastics articles. Said method includes the step of producing a film of silicone rubber on the sealing surface of the article. Advantageously, this film is formed by co-moulding or co-extrusion with the plastics article itself. The thickness of the said film may vary from a few tenths of a millimeter to a few millimeters. In the case of cylindrical elements, such as the pistons of the delivery cocks of ice cream machines, this film preferably covers only the side wall or the sealing part of the side wall of the cylindrical element, while in the case of flat elements, this film covers only the sealing surface of this element.

17 Claims, 3 Drawing Sheets

U.S. PATENT DOCUMENTS

| | | |
|---|---|---|
| 4,862,967 A | 9/1989 | Harris |
| 5,199,278 A | 4/1993 | Cocchi |
| 5,279,606 A | 1/1994 | Haber et al. |
| 5,395,060 A | 3/1995 | Hackel et al. |
| 5,528,863 A | 6/1996 | Scott |
| 5,564,714 A | 10/1996 | Katsuno et al. |
| 5,858,287 A | 1/1999 | Scott |
| 5,898,105 A | 4/1999 | Owens |
| 5,922,263 A | 7/1999 | Endo et al. |
| 5,947,116 A * | 9/1999 | Gamow et al. ........... 128/201.11 |
| 5,957,163 A | 9/1999 | Ito et al. |
| 5,975,093 A | 11/1999 | Joulia |
| 5,977,266 A | 11/1999 | Reil et al. |
| 6,342,314 B1 * | 1/2002 | Sieminski et al. .............. 429/13 |
| 6,403,027 B1 | 6/2002 | Napoles et al. |
| 6,703,157 B1 | 3/2004 | Shoji et al. |
| 2002/0062864 A1 * | 5/2002 | Griffin ......................... 137/240 |
| 2002/0121527 A1 | 9/2002 | Good |
| 2003/0088216 A1 | 5/2003 | Py |
| 2004/0081733 A1 | 4/2004 | Buter et al. |
| 2009/0200696 A1 * | 8/2009 | Cocchi et al. ............ 264/173.16 |

FOREIGN PATENT DOCUMENTS

| | | |
|---|---|---|
| DE | 4035657 | 5/1992 |
| EP | 0091541 | 10/1983 |
| EP | 0911273 | 4/1999 |
| EP | 0942245 | 9/1999 |
| EP | 1174482 | 1/2002 |
| EP | 1195096 | 4/2002 |
| GB | 929476 | 6/1963 |
| GB | 2249739 | 5/1992 |
| JP | 55144124 | 11/1980 |
| JP | 58002376 | 1/1983 |
| JP | 11201289 | 7/1999 |

* cited by examiner

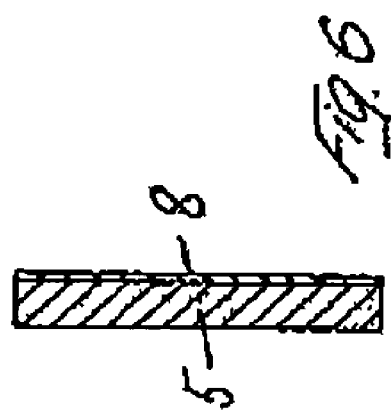
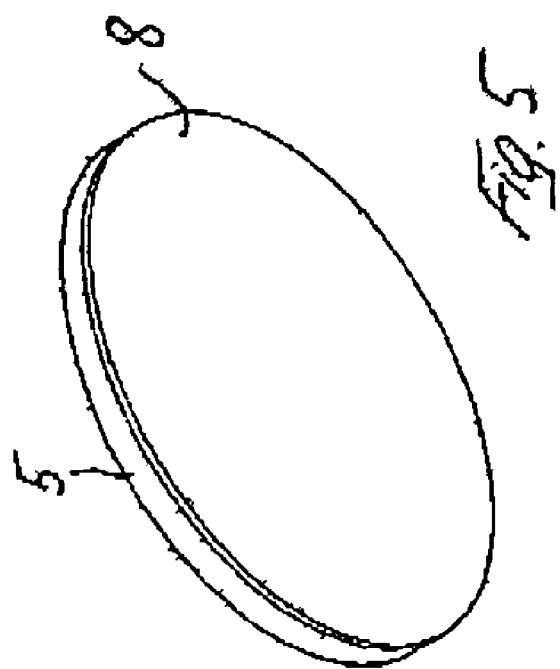

METHOD FOR THE PRODUCTION OF INTEGRATED SEALING ELEMENTS ON PLASTIC ARTICLES BY OVERMOULDING WITH SILICONE FILMS

This application is a divisional of U.S patent application Ser. No. 10/452,251, filed Jun. 3, 2003 now U.S. Pat. No. 7,476,353, and claims priority to Italian Patent Application No. GE2002A000061, filed Jul. 5, 2002, both of which are incorporated by reference herein, in their entirety.

BACKGROUND AND SUMMARY OF THE INVENTION

The present invention relates to plastics articles, especially plastics articles forming elements of moving sealing devices, particularly for machines for producing and/or dispensing food products, such as the pistons of piston-type delivery cocks used in "soft"-type ice cream making machines, or the doors that close the ice cream delivery mouths of batchwise ice cream making machines, or more generally any moving closing element that requires a leaktight seal.

These elements have hitherto been fitted with O-rings seated in semicircular-section grooves formed in the actual article. However, in machines for producing and/or dispensing food products this sealing system has serious drawbacks in terms of hygiene because quantities of product get into the interstices between the grooves housing the O-rings and the O-rings themselves, from where the product is difficult to remove using the automatic washing cycles of these machines, and, given that such products are usually highly perishable, such as for example ice cream, its presence is a not insignificant source of bacterial contamination.

Furthermore, efficient cleaning of such elements would require removing the said O-rings from their seats, which would waste a lot of time and could damage the O-rings, possibly irreparably.

The object of the present invention is therefore to provide a method for the production of sealing elements on plastics articles, that will eliminate the disadvantages of the O-rings used at present and that will be easy and inexpensive to put into practice.

In accordance with the main characteristic of the present invention, this method consists in the production of a film of a silicone material on the sealing surface of the article. Advantageously, this film is co-moulded or co-extruded with the plastics article itself. The thickness of this film may vary from a few tenths of a millimeter to a few millimeters. In particular, in the case of cylindrical elements, such as the pistons of the delivery cocks of ice cream machines, this film preferably covers the whole cylindrical side wall of the piston, while in the case of flat elements this film covers only the sealing surface of this element.

The advantages presented by the present method will be obvious. The silicone surfaces covering the articles have no roughnesses or nooks and crannies and can be washed completely clean with the greatest ease and simplicity What is more, the cost of manufacture of these articles is much less than that of conventional articles fitted with O-rings.

BRIEF DESCRIPTION OF THE DRAWINGS

Other objects and advantages of the present invention will become clear in the course of the following detailed description of certain embodiments thereof, given by way of non-restrictive example with reference to the appended drawings, in which:

FIG. 5 is a perspective view, from the rear, of a door of the same type as in FIG. 3, modified in accordance with the principles of the present invention; and FIG. 6 is a cross section through the door shown in FIG. 5.

DESCRIPTION OF THE PREFERRED EMBODIMENTS OF THE INVENTION

Figure 2:
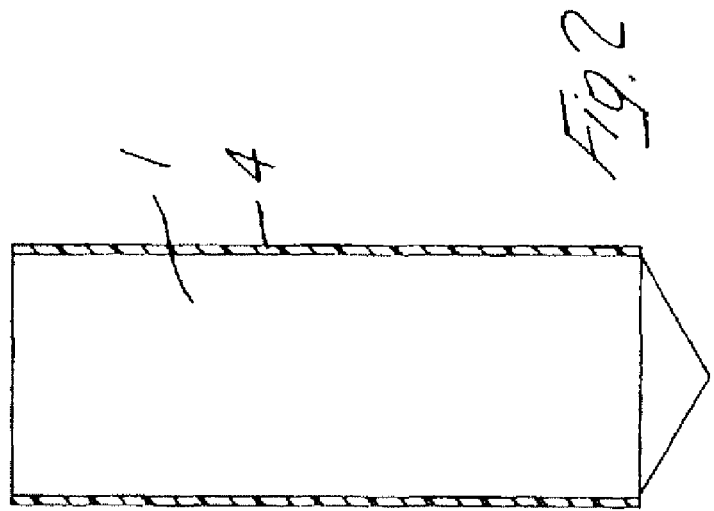
FIG. 2 is a side view, with parts in section, of a piston for an ice cream delivery cock of the same type as in FIG. 1, modified in accordance with the present invention.
Figure 1:
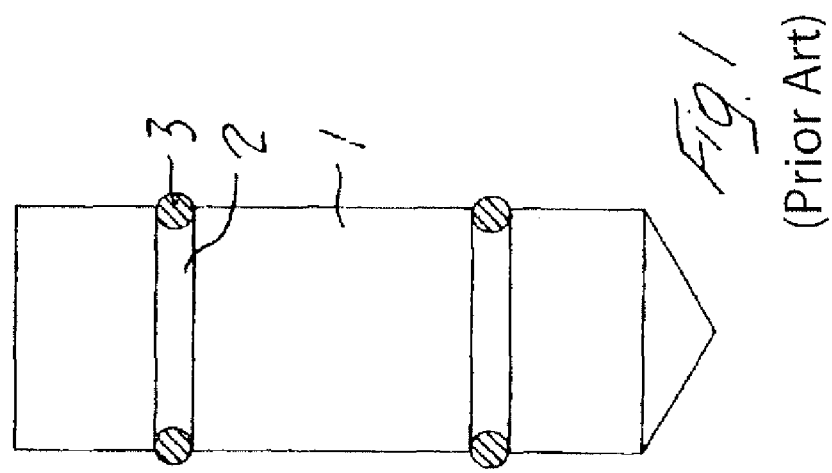
FIG. 1 is a side view, with parts in section, of a piston for an ice cream delivery cock as used for example in soft ice cream making machines or in water-ice dispensing machines.
Figure 4:
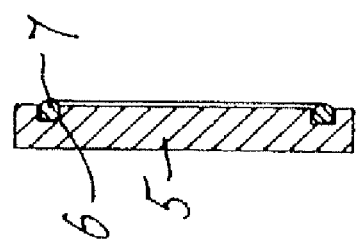
FIG. 4 is a cross section through the door shown in FIG. 3.

With reference to the drawings, and with particular reference to FIG. 1 thereof, the number 1 indicates a conventional piston of the type used in ice cream or water-ice delivery cocks in machines for the extemporaneous production of these products. The said piston comprises a cylindrical, possibly conically-ended body made of a plastics material and provided with a Series of annular grooves 2 for seating O-rings 3. As mentioned in the introductory part of this account, it is very difficult to carry out truly thorough cleaning that will eliminate all residues of ice cream from the interstices between the O-rings 3 and their seats 2, without removing the said O-rings 3 each time, in which process they may become damaged, and which in any case is very time-consuming.

In accordance with the present invention this problem is solved by forming on the side wall of the piston 1 a covering layer 4 of silicone rubber, the layer advantageously being produced by co-moulding or co-extruding the two plastics materials of the piston and of the coating. This characteristic not only makes the piston 1 leaktight but also easily and effectively solves the problem of how to clean it as there is nowhere for the highly perishable material such as ice cream to be trapped.

Figure 3:
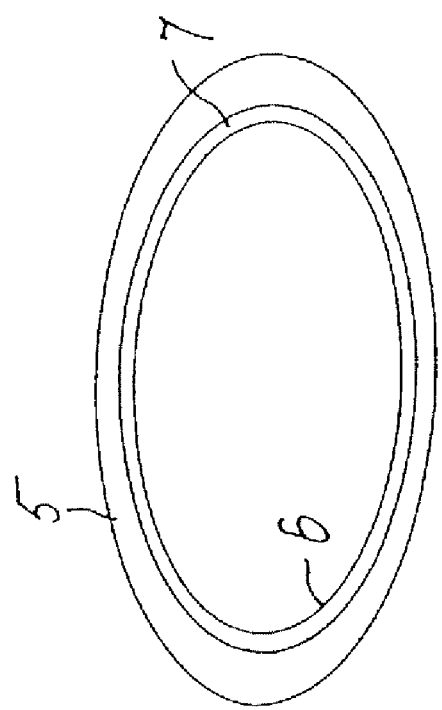
FIG. 3 is a rear view of a door used for example to close the ice cream discharge port of a machine for the batchwise production of ice cream.

FIG. 3 illustrates the rear of a closing door 5 used for example to close the ice cream discharge port of a machine for the batchwise production of ice cream. As can be seen, this door 5, which is also made of a hard plastics material, has on its rear an annular groove 6 in which an O-ring 7 is seated. The problems presented by this door are the same as with the piston 1 of FIG. 1. FIGS. 5 and 6 show the modification of the door 5 according to the invention. In accordance with this modification, a layer of silicone rubber a has been applied to the rear of the door 5, again by co-moulding the materials of the door and of the silicone rubber.

The present invention is not of course limited to the illustrative embodiments shown and described but rather can be applied to any element having sealing means that present the problems discussed with reference to the elements illustrated and described.

We claim:

1. A method for producing a machine for making frozen food products, comprising:
    providing a movable body that is movable between a closed position closing a discharge port of the machine and an open position opening the discharge port of the machine;
    providing the movable body with a sealing surface that engages wall structure of the machine surrounding the discharge port such that in the closed position, a portion of the sealing surface is sealingly engaged against the wall structure to seal and cover the discharge port with a portion of the sealing surface being in contact with food product in the discharge port; the sealing surface remaining in engagement with the wall structure as the movable body is moved to and positioned in the open position;

providing that the sealing surface is a smooth and continuous surface of silicone rubber that covers an entire portion of the movable closing element that contacts the food product when and as the movable closing element is opened and closed to inhibit trapping of residues of the food product with which the sealing surface has been in contact.

2. The method of claim 1, wherein, the movable body is provided with a generally cylindrical side wall and the smooth and continuous sealing surface of silicone rubber covers the whole generally cylindrical side wall and the sealing surface is maintained in continuous sliding engagement with the wall structure as the movable body moves between the closed position and the open position.

3. The method of claim 2, wherein the sealing surface is a layer of silicone rubber applied over the movable body.

4. The method of claim 2, wherein the sealing surface is co-molded over the movable body.

5. The method of claim 2, wherein the sealing surface is co-extruded over the movable body.

6. The method of claim 1, wherein, the movable body is a piston for a piston-type delivery cock of the machine, the piston including a generally cylindrical side wall and the smooth and continuous sealing surface of silicone rubber covers the whole generally cylindrical side wall, the wall structure surrounding the discharge port is part of the delivery cock and the sealing surface is maintained in continuous sliding engagement with the wall structure as the movable body moves between the closed position and the open position.

7. The method of claim 6, wherein the sealing surface is a layer of silicone rubber applied over the movable body.

8. The method of claim 6, wherein the sealing surface is co-molded over the movable body.

9. The method of claim 6, wherein the sealing surface is co-extruded over the movable body.

10. The method of claim 1, wherein, the movable body is a flat closing door for closing the discharge port, the smooth and continuous sealing surface of silicone rubber covers an entire flat surface of at least one side of the closing door and the sealing surface is maintained in continuous sliding engagement with the wall structure as the movable body moves between the closed position and the open position.

11. The method of claim 10, wherein the sealing surface is a layer of silicone rubber applied over the movable body.

12. The method of claim 10, wherein the sealing surface is co-molded over the movable body.

13. The method of claim 10, wherein the sealing surface is co-extruded over the movable body.

14. A method for producing a machine for making frozen food products, comprising:

providing a movable closing element that is movable to a closed position to close a discharge port of the machine to prevent flow of food product through the discharge port and away from the closed position to open the discharge port of the machine to allow flow of the food product through the discharge port;

providing the movable closing element with a sealing surface that, in the closed position, covers the entirety of the discharge port and is in contact with the food product and also extends beyond the discharge port to sealingly engage structure of the machine surrounding the discharge port to provide a leak-tight seal between the discharge port and the sealing surface;

providing that the sealing surface is a smooth and continuous surface of silicone rubber that covers an entire portion of the movable closing element that contacts the food product when and as the movable closing element is opened and closed to inhibit trapping of residues of the food product with which the sealing surface has been in contact.

15. The method of claim 14, wherein, the movable body is a flat closing door for closing the discharge port, the smooth and continuous sealing surface of silicone rubber covers an entire flat surface of at least one side of the closing door.

16. The method of claim 15, wherein the sealing surface is maintained in continuous sliding engagement with the wall structure as the movable body moves between the closed position and the open position.

17. The method of claim 16, wherein the sealing surface is co-extruded over the movable body.

* * * * *